United States Patent
Krayer

(10) Patent No.: US 7,147,445 B2
(45) Date of Patent: Dec. 12, 2006

(54) TURNTABLE WITH TURNING GUIDE

(76) Inventor: William L. Krayer, 1771 Helen Dr., Pittsburgh, PA (US) 15216

( * ) Notice: Subject to any disclaimer, the term of this patent is extended or adjusted under 35 U.S.C. 154(b) by 0 days.

(21) Appl. No.: 11/060,101

(22) Filed: Feb. 17, 2005

(65) Prior Publication Data

US 2005/0196311 A1    Sep. 8, 2005

Related U.S. Application Data

(63) Continuation-in-part of application No. 10/791,596, filed on Mar. 2, 2004.

(60) Provisional application No. 60/578,580, filed on Jun. 10, 2004, provisional application No. 60/563,945, filed on Apr. 22, 2004.

(51) Int. Cl.
*F01C 21/10* (2006.01)
*F03C 2/00* (2006.01)

(52) U.S. Cl. .................... 418/150; 418/61.3; 418/166; 108/139; 108/103; 108/94; 312/238

(58) Field of Classification Search ............... 108/139, 108/20–22, 94, 103; 418/61.3, 150, 166, 418/171; 312/238

See application file for complete search history.

(56) References Cited

U.S. PATENT DOCUMENTS

| 1,628,013 | A |   | 5/1927  | Twedt |
|-----------|---|---|---------|-------|
| 2,062,807 | A |   | 12/1936 | Cramer |
| 2,209,201 | A |   | 7/1940  | Hill |
| 2,628,880 | A |   | 2/1953  | Kader |
| 2,629,643 | A |   | 2/1953  | Davidson |
| 2,648,579 | A |   | 8/1953  | Slyter et al. |
| 2,693,401 | A |   | 11/1954 | Brown |
| 2,874,594 | A |   | 2/1959  | Sundt |
| 2,988,065 | A |   | 6/1961  | Wankel et al. |
| 2,994,277 | A | * | 8/1961  | Merritt .................... 418/150 |
| 3,198,594 | A |   | 8/1965  | Murray |
| 3,304,808 | A |   | 2/1967  | Grant |
| 3,369,320 | A |   | 2/1968  | Hronas et al. |
| 3,779,521 | A |   | 12/1973 | Godines |
| 3,834,842 | A |   | 9/1974  | Dorff et al. |
| 3,913,533 | A |   | 10/1975 | Meaden |
| 3,937,458 | A |   | 2/1976  | Langen |
| 3,955,903 | A | * | 5/1976  | de Dobo .................... 418/150 |

(Continued)

FOREIGN PATENT DOCUMENTS

JP          11267950 A  *  10/1999

OTHER PUBLICATIONS

Gardner, Martin "Mathematical Games" Scientific American, Feb. 1963, pp. 148-156.

(Continued)

*Primary Examiner*—Theresa Trieu

(57) ABSTRACT

A gerotor mechanism is used to guide the rotation of a turntable having a Reuleaux triangle shape. In one version, the mechanism includes a gerotor having three lobes, and the gerotor guide has a guide profile including four recesses for receiving the lobes of the gerotor. Rotation is governed by a 4:3 hypocycloid function. The profiles of the gerotor and the gerotor guide are expanded uniformly from an original hypocycloid pattern so that rotation of the turntable results in execution of the hypocycloid function while retaining the gerotor in controlled contact with the profile of the gerotor guide. A reciprocal of the hypocycloid function yields a "cloverleaf" gerotor. Substantially planar bearing surfaces may be used at the interface of (a) the turntable and the gerotor guide, (b) the gerotor and the gerotor guide, or (c) the gerotor and the underlying support surface. The gerotor guide and turntable may be part of a cabinet or built into a kitchen countertop.

17 Claims, 12 Drawing Sheets

U.S. PATENT DOCUMENTS

| | | |
|---|---|---|
| 4,018,548 A | 4/1977 | Berkowitz |
| 4,035,706 A | 7/1977 | Cutler |
| 4,052,928 A | 10/1977 | Pierrat et al. |
| 4,074,778 A | 2/1978 | Morrell et al. |
| 4,084,927 A | 4/1978 | Amdall |
| 4,086,038 A | 4/1978 | Lambracht |
| 4,389,172 A | 6/1983 | Griffith |
| 4,519,755 A | 5/1985 | Hanson |
| 4,587,908 A | 5/1986 | DeBruyn |
| 5,046,932 A | 9/1991 | Hoffmann |
| 5,152,592 A | 10/1992 | Krayer |
| 5,701,694 A | 12/1997 | Atkinson |
| 5,762,484 A | 6/1998 | Whitham |
| 5,820,504 A | 10/1998 | Geralde |
| 6,213,744 B1 | 4/2001 | Choroszylow et al. |
| 6,322,679 B1 | 11/2001 | De Bosscher et al. |
| 6,552,349 B1 | 4/2003 | Gagnon et al. |
| 6,568,772 B1 | 5/2003 | Gerkey et al. |
| 2002/0117943 A1* | 8/2002 | Gerkey et al. ............ 312/238 |

OTHER PUBLICATIONS

Reuleaux, Franz "The Kinematics of Machinery" Dover Publications 1963, pp. 131-164.

* cited by examiner

TURNTABLE WITH TURNING GUIDE

RELATED APPLICATIONS

This is a continuation-in-part of application Ser. No. 10/791,596 filed Mar. 2, 2004, and also claims the full benefit of Provisional Applications 60/563,945 filed Apr. 22, 2004 and 60/578,580 filed Jun. 10, 2004.

TECHNICAL FIELD

This invention relates to turntables, rotatable shelves, and lazy susans, particularly for corner cabinets and the back corners of kitchen countertops. The invention comprises an eccentric rotation and bearing system for a Reuleaux triangle shaped turntable.

BACKGROUND OF THE INVENTION

This invention is an improvement on Krayer U.S. Pat. No. 5,152,592, which discloses the use of a 4:3 hypocycloid rotation guide for rotating a shelf in the shape of a Reuleaux triangle. FIGS. 5A to 5H of the '592 patent illustrate that the rotation of a Reuleaux triangle-shaped shelf in a square area can be adapted to the floor or shelf of a corner cabinet such as a standard corner kitchen cabinet in a generally square shape. During the rotation, the shelf follows closely all four sides of the square area at all times, the apexes of the Reuleaux triangle describing the substantially square area as they rotate, and results in alternate recessed and projecting modes when used in a corner cabinet having a 45° face. The kinematics of such a rotation permits various types of guides such as are shown in FIGS. 6–13 and 17–19 of the U.S. Pat. No 5,152,592 patent. The entire patent U.S. Pat. No. 5,152,592 is incorporated herein by reference.

If a Reuleaux triangle is caused to turn in a full square precisely as disclosed in FIGS. 5A to 5H of U.S. Pat. No. 5,152,592, the discerning experimenter will observe that the path of the center of the Reuleaux triangle is not exactly a true circle; rather, it comprises four elliptical curves. Nevertheless, the path is close enough to circular that a shelf guide based on circular motion is quite practical.

While the turntable or shelf disclosed by Krayer in U.S. Pat. No. 5,152,592 is appealing in many respects, the original guide system in practice entailed the use of ball casters in a groove such as depicted in FIG. 7. The ball casters were noisy and their durability was suspect.

This invention is also an improvement on Gerkey and Kugler U.S. Pat. No. 6,568,772, which describes the use of substantially planar bearings for a shelf or turntable in the shape of a Reuleaux triangle. U.S. Pat. No. 6,568,772 is also incorporated herein by reference in its entirety.

While the planar bearings of the Gerkey and Kugler disclosure are an excellent improvement on the ball casters disclosed in Krayer U.S. Pat. No. 5,152,592, the guide groove and vertical-axis rollers proposed by Gerkey and Kugler to guide the rotation of the shelf save little in terms of expense compared to my earlier proposed ball casters and groove. Accordingly, a different application of the hypocycloid principle is needed in the art of rotatable shelves.

The reader may be interested in reviewing some or all of the patents mentioned in this paragraph. The term "gerotor," used in the present disclosure and claims, may be found, for example, in Hanson U.S. Pat. No. 4,519,755 and Whitham U.S. Pat. No. 5,762,484. Illustrations of various internal gear-like mechanisms having ratios other than 4:3 may be seen in the following U.S. Patents: Grant U.S. Pat. No. 3,304,808, Sundy U.S. Pat. No. 2,874,594, Hill U.S. Pat. No. 2,209,201, Dorff et al U.S. Pat. No. 3,834,842, Godines U.S. Pat. No. 3,779,521, Meaden U.S. Pat. No. 3,913,533, Geralde U.S. Pat. No. 5,820,504, and Hoffmann U.S. Pat. No. 5,046,932. The term "Reuleaux triangle" appears recently in Gagnon et U.S. Pat. No. 6,552,349; see also Morrell et al U.S. Pat. No. 4,074,778, and Roepke et al U.S. Pat. Nos. 4,012,077 and 4,062,595. Many turning supports such as swivels for various turntable-like elements have been suggested—see, for example, U.S. Pat. No. 2,062,807 to Cramer, U.S. Pat. No. 2,648,579 to Slyter et al, U.S. Pat. No. 5,701,694 to Atkinson, and U.S. Pat. No. 1,628,013 to Twedt.

SUMMARY OF THE INVENTION

In one aspect, my invention comprises a guide mechanism for turning a Reuleaux triangle shaped object within a substantially square area comprising a base and a gerotor attached to the Reuleaux triangle shaped object, the base housing an interior rotation profile comprising quadrilaterally symmetrical recesses and the gerotor having an exterior rotation profile comprising trilaterally symmetrical lobes, the shapes and sizes of the base and the gerotor being derived from a hypocycloid function having a ratio of 4:3 and resulting in the containment of the rotor within the interior rotation profile of the base so that no substantial movement of the gerotor within the base will occur other than one derived from the hypocycloid function. Where the turntable is substantially horizontal, its weight or load is supported on substantially planar bearing surfaces which may be interfacing surfaces of (a) the underside of the Reuleaux triangle shaped object and the upper side of the base, or (b) the underside of the gerotor and a surface on the base and within the interior rotation profile, or (c) the underside of the gerotor and a surface on which the turntable is placed, such as a countertop, or a cabinet floor or shelf.

A common use of the invention is expected to be as a turntable, turned by the user, located in a corner cabinet or in a back countertop corner, so that the Reuleaux triangle shaped turntable will make efficient use of the corner space while providing convenient access to items on the turntable. The turntable itself may support a cabinet or a more intricate storage unit, or any structure wherein the unique turning characteristics of the invention are useful.

The present invention utilizes a turning guide for a Reuleaux triangle turntable requiring neither ball casters as suggested in my earlier patent nor vertical-axis rollers as proposed by Gerkey and Kugler. Rather, the present includes a base rotation guide profile complementary to a rotation guide profile fixed to the Reuleaux triangle shaped turntable, both of the rotation guide profiles manifesting a rotation path representing a 4:3 hypocycloid function. In one aspect, the base has an interior rotation profile comprising quadrilaterally symmetrical recesses and the turntable has an exterior rotation profile comprising trilaterally symmetrical lobes, the shapes and sizes of the base rotation profile and the turntable rotation profile being derived from a hypocycloid function having a ratio of 4:3 and resulting in the containment of the turntable rotation profile within the base rotation profile so that no substantial movement of the turntable bearing within the base rotation guide profile will occur other than one kinematically dictated by the hypocycloid function. The center of the turntable rotation profile, which I call a gerotor, is coincident with the center of the turntable (sometimes referred to as a shelf).

In another aspect, the base has a rotation guide profile having four substantially equal circular arc profiles, each having a radius g originating at an origin equidistant from a center, the origins of the radius being ninety degrees apart from each other with respect to the center.

In another aspect, my invention comprises a gerotor, a Reuleaux triangle shaped turntable attached to the gerotor, and a gerotor guide, the gerotor guide and gerotor being in a hypocycloid relationship, the hypocycloid relationship being based on a gerotor guide circle having a diameter about 0.6184 times the width of the Reuleaux triangle shaped turntable or its functional equivalent, the gerator guide circle further being in a ratio of 4:3 to a gerotor circle, whereby the shapes of the gerotor and the gerotor guide are determined by the path of a point on the gerotor circle turning in hypocycloid relation within the gerotor guide circle, and wherein the shapes of the gerotor and the gerotor guide are expanded from the path by a dimension g. The parametric equations $x=0.25R \cos \theta + 0.75R \cos \theta/3$ and $y=0.25R \sin \theta - 0.75R \sin \theta/3$ will yield the internal profile of the gerotor guide prior to expansion, where R is the radius of the large circle and $\theta$ is the angle of the center of the gerotor circle with respect to the center of the gerotor guide circle. By expansion, I mean that the internal profile of the gerotor guide is made larger by a desired dimension g which is applied around the entire perimeter of the profile. More particularly, the shapes of the gerotor guide and gerotor are usefully expanded by an increment between about $\frac{1}{10}$ to about one-half of the radius of the gerotor guide circle. With suitable bearings, the gerotor will turn smoothly in the gerotor guide, resulting in points at the apexes of the Reuleaux triangle describing four substantially straight lines comprising a substantially square area having rounded corners. In practice, one may want to provide a small space or tolerance between the gerotor and the gerotor guide around their peripheries to assure smooth turning.

The gerotor itself may have a planar bearing surface on its under side, designed to rest and turn on a planar surface on the base, or on a floor separate from the base rotation guide profile. Or, planar bearing surfaces may be interfaced between the under side of the turntable, apart from the gerotor, with the upper surfaces of the base which forms the base rotation guide profile.

In another aspect, my invention utilizes a 4:3 hypocycloid rotation, and in particular the path followed by a point on the smaller circle as it rotates within the larger circle. Such a point will describe a concave square (see dotted lines E in FIG. 1). My invention includes the use of a rotor guide having a profile determined by expanding such a point path preferably by a distance of at least one-half the distance between the centers of the two circles. The expansion may be considerably larger, but I prefer between about 0.75 and 2 times the distance between the centers of the two circles. More preferably, the expansion dimension g will be between about 0.2R and 0.45R. If the expansion is less than about 0.125R, the rotor may be subject to jamming in the rotor guide but nevertheless may be useful in some circumstances; if it is larger than 0.5R, the rotor guide may be too large for some applications.

The term "gerotor" may appear in the prior art to describe either a gear-type member which rotates within a ring or internal gear element (that is, the ring or internal gear element is an element having gear-like "teeth" directed inwardly on the inside of a ring), or the assembly of both the gear-type member and the ring or internal gear element taken together. The rotating gear-type member generally has one fewer teeth than the relatively stationary internal or ring gear. In either case, it is understood that the assembly is designed so that the rotating gear-type member is confined to a rotation path such that its center must revolve around the center of the internal or ring gear, even without a rigid connection between the centers. This is normally accomplished by dimensioning both members so that when one of the teeth of the rotating member is at the full depth of a recess in the ring member, there are two teeth on its opposite side that are in contact with teeth on the ring member, preventing it from disengaging.

In the present description and claims, "gerotor" is used in the first sense—that is, to refer to the gear-type member which rotates within the relatively stationary ring or internal gear element, always in contact with the ring gear element on generally opposite sides so that its motion can only result in the revolution of its center around the center of the ring gear element. The relatively stationary ring or internal gear element is the "gerotor guide." "Gerotor bearing" in the present specification means a gerotor having a substantially planar surface which can act as a load-bearing surface on a "gerotor guide bearing" or forming a bearing interface with a substantially planar surface such as a countertop or a cabinet floor. A "bearing interface" herein is created when one substantially planar surface rests on another, facilitating turning while supporting a load. Possibly the bearing surfaces will have a low coefficient of friction, but the selection of materials for the bearing surfaces offers a wide range of discretion, since the load is normally distributed over a large interface area. The "gerotor guide bearing" is a substantially planar surface built into a gerotor guide. The gerotor guide bearing may be either within a guide profile, and therefore a bearing surface on which the gerotor resides and is turned, or it may be on the guide's upper surface. The terms "gerotor guide circle" and "gerotor circle" refer to the large and small circle of the 4:3 hypocycloid function which determine the kinematics of the relationship between the gerotor guide and the gerotor of the present invention. They are not tangible parts, but are demonstrable from the tangible parts. Bearing in mind that, as indicated in the Background of the Invention, where a Reuleaux triangle is caused to rotate in a precise square, always touching all four sides of the square, the rotation of the Reuleaux triangle's center is not an exact circle but rather a close approximation of a circle comprising four elliptical paths, it is possible to modify the gerotor circle and the gerotor guide circle to reflect the minor deviation from a circular form. Doing so will result in the apexes of the Reuleaux triangle following more correctly straight lines on the sides of the square than is the case when the gerotor guide circle and the gerotor circle are actual circles. I intend for the terms gerotor circle and gerotor guide circle to include such minor modifications. As used herein, "Reuleaux triangle" is a geometric figure derived from an equilateral triangle by drawing arcs from each apex to the adjacent apex, having radii equal to the sides of the equilateral triangle. It is one of a family of curves known as curves of constant width, of which the circle is perhaps the most common. As used herein, "Reuleaux triangle" is intended to include slight modifications, such as an "expanded Reuleaux triangle" in which the outer edge is broadened so that its perimeter is substantially uniformly larger than the underlying Reuleaux triangle, and so the resulting figure (or turntable) continues to have a substantially constant width. The expanded Reuleaux triangle is thus a functional equivalent of an unexpanded one, in that the hypocycloid dimensions and ratios are based on the underlying unexpanded Reuleaux triangle in both cases. "Countertop material" is any material used for a kitchen or other countertop. Examples are filled acrylics and filled unsaturated polyester polymers; both thermoplastic and thermoset materials, as well as natural stones, are intended to be included.

DETAILED DESCRIPTION OF THE INVENTION

Figure 1:
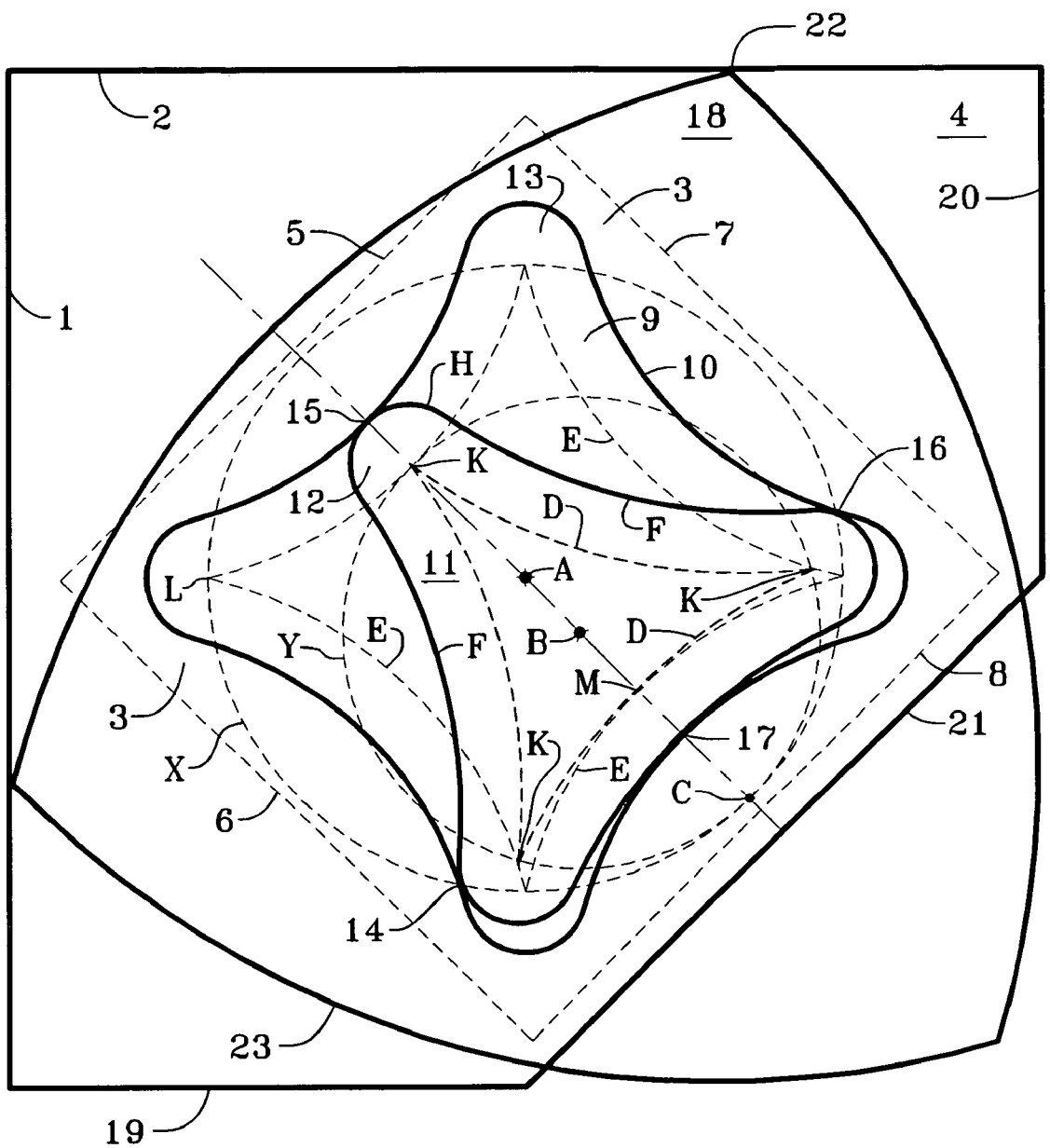
FIG. 1 is a diagrammatic depiction of the three major elements of the invention—the gerotor, the gerotor guide, and the Reauleaux triangle shaped turntable, on the floor of an idealized corner cabinet. The drawing shows the geometric and kinematic relationships of the major parts. The turntable is in the "projecting" position.

Referring to FIG. 1, an outline of a corner comprises substantially orthogonal walls 1 and 2, which may be either part of a building such as a kitchen wall, or integral to a cabinet. A gerotor guide 3 is placed on surface 4 of the corner. Surface 4 together with walls 1 and 2 could be a kitchen countertop, the floor or a shelf (a "level") of a corner cabinet, or any other corner environment. Gerotor guide 3 may be a square, substantially flat element having a back 5, sides 6 and 7, a front 8, and center A. The principle feature of gerotor guide 3 is as a housing accommodating hollowed-out area 9. Hollowed-out area 9 is shaped to have a profile 10 preferably substantially as shown, which will be explained further below. Hollowed-out area 9 may be to a partial depth in gerotor guide 3 or entirely removed. If area 9 is hollowed out to a depth which leaves a surface in gerotor guide 3, the surface may be substantially planar and possibly low friction. If area 9 is entirely removed from gerotor guide 3, resulting in a hole or aperture in the shape of profile 10, the gerotor guide 3 may be placed on a surface which is substantially planar and possibly having a low coefficient of friction, such as a cabinet floor. Front edges 19 and 20 may be side walls of the cabinet, substantially orthogonal to walls 1 and 2, and in planes substantially orthogonal to each other.

Within the hollowed-out area 9 is placed gerotor 11, having the shape substantially as shown and a center B. Gerotor 11 has three lobes 12, while gerotor guide 3 has four corner recesses 13 which form part of profile 10. The lobes 12 are designed and dimensioned to fit into the recesses 13 as the gerotor 11 is turned (see FIG. 2). Note that, when the gerotor 11 is in the position shown in FIG. 1, it contacts profile 10 at four points—contact points 14, 15, 16, and 17. Because of the contours of profile 10 and gerotor 11, gerotor 11 cannot be moved in any direction from the position shown in FIG. 1 except one which will cause center B of the gerotor 11 to begin revolving at a constant distance around center A of the gerotor guide 3. This is so because the gerotor 11 and gerotor guide 3 are based on a hypocycloid function having particular characteristics. It is desirable because gerotor 11 is fixed to a turntable 18 in the shape of a Reuleaux triangle, and the purpose of the invention is to facilitate the rotation of the turntable 18 within a square area outlined by walls 1 and 2 and partially by front edges 19 and 20. Front edges 19 and 20 may be considered merely to define an area of interest on a countertop, for example, or, together with the 45° face 21, the outline of a corner cabinet.

The shapes of profile 10 and gerotor 11 may be understood with reference to circles X and Y. Circles X and Y are not actual parts of the apparatus, but illustrate the kinematic principles on which the apparatus is based. Circle X has a center A, which is the same center A of the gerotor guide 3 (and also the center of the square defined by walls 1 and 2 and front edges 19 and 20), and circle Y has center B, the same center as center B of gerotor 11. Circle X is sometimes called herein the "gerotor guide circle" and circle Y is sometimes the "gerotor circle." The diameters of circles X and Y are in a ratio of 4:3, and in FIG. 1 they contact at point C. The kinematics of the rotation of gerotor 11 within gerotor guide 3 are governed by a hypocycloid function wherein the smaller circle Y, which may be imagined as points on the gerotor 11, rotates within larger circle X, representing points on the gerotor guide 3. The diameter of circle X is 0.6184 of the width of turntable 18, i.e. the radius of an arc drawn from an apex 22 of turntable 18 to an opposite side 23 of turntable 18, as is discussed in U.S. Pat. Nos. 5,152,592 and 6,568,772, incorporated herein by reference in their entireties. Dotted lines E represent the path followed by points K on smaller circle Y as smaller circle Y rotates within larger circle X, contacting it at all times as is required for a hypocycloid function. There are three points K on circle Y, 120° apart. Points K contact the large circle X at four points L 90° apart on circle X as circle Y rotates within circle X. Dotted lines D represent the path followed by a point on a circle (not shown) having a radius ⅔ that of circle Y rolling on the inside of circle Y also in hypocycloid fashion. They may be generated by the parametric equations x=r/3 cos θ+2r/3 cos θ/2 and y=r/3 sin θ−2r/3 sin θ/2, where r is the radius of the small circle. Point M is the same distance from point B as the distance point B is from point A, namely ⅓ of the radius of small circle Y and ¼ of the radius of large circle X. Except when the gerotor 11 is in the position shown in FIG. 2, at least one of the dotted lines D will be in contact with a dotted line E (for example, at point M) as the gerotor 11 is rotated. However, as may be seen, I do not use the shapes of lines D and E themselves to guide the rotation of the gerotor and the turntable, but rather I utilize an "expanded" shape for the gerotor 11 and gerotor guide 3.

Gerotor 11 is defined by contour lines F and lobe profiles H. Contour lines F are separated from dotted lines D along their lengths, in this case by a dimension equal to the distance between point M and point 17. Lobe profile H is a substantially circular arc having a radius also equal to the distance between point M point 17, and an origin at a point K. The expanded profile 10 of gerotor guide 3 includes recesses 13 connected by concave curves which are a constant distance from dotted lines E, also by a dimension equal to the distance between points M and 17, and recesses 13 are substantially circular arcs having a radius substantially equal to the radius of lobes 12 on gerotor 11 (and therefore substantially equal to the distance between point M and point 17) and an origin at point L. There are four points L on circle X, ninety degrees apart. As indicated above, in this example of my invention, the gerotor 11 and gerotor guide 3 are expanded beyond the shapes of dotted lines D and E by a dimension equal to the distance between points M and 17, which in this case is about one third the radius of small circle Y. As will be discussed elsewhere herein, my invention includes an expansion factor g which may vary between 0.125 and 0.375 (or more) times the radius of the large circle X. That is, the perimeters of the geometric figures described by dotted lines D and E are usefully expanded uniformly by a dimension selected between 0.1R and 0.5R (or more) where R is the radius of the large circle X.

It should be noted that, in this configuration, the turntable 18 projects through the 45° cabinet face 21. Also note that apex 22 contacts wall 2. As the turntable 18 is moved manually, apex 22 will move in a straight line along wall 2 (its counterpart on wall 1 will also move in a straight line) almost to the corner. Persons skilled in the art may recognize that this diagrammatic depiction idealizes the actual slight deviations from straight line motion by the apexes, so that in practice a small distance or tolerance may be designed into the space between wall 2 and apex 22 to avoid friction between turntable 18 and the walls, and to allow for a possible slight misplacement of gerotor guide 3 or a corner slightly off from 90°. Indeed, the turntable need not be used in a corner at all, but it will still describe a substantially square area.

Figure 2:
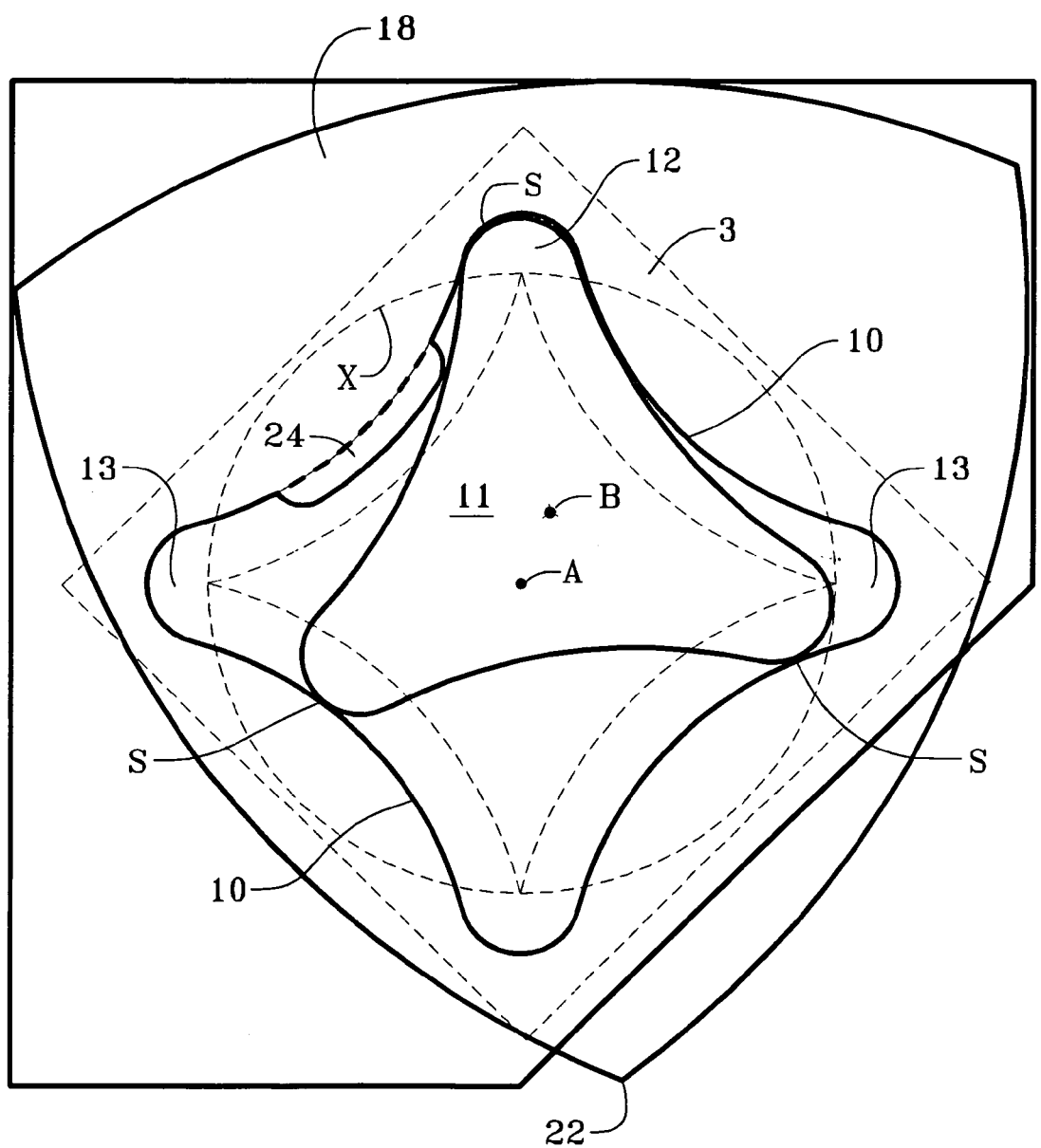
FIG. 2 shows the relationship of the major elements after the turntable has been turned a small angular distance from the position of FIG. 1.

Referring now to FIG. 2, gerotor 11, fixed to turntable 18, is shown in a position different from that of FIG. 1. Unlike FIG. 1, gerotor 11 contacts profile 10 at three points S, and one of the lobes 12 of gerotor 11 is entirely within one of the recesses 13 of gerotor guide 3. It will be observed, however, that except for the position of FIG. 2, the gerotor 11 will always be in contact with profile 10 at four points as described with reference to FIG. 1, which assures that the gerotor 11 cannot "float" outside of its prescribed path and will not become bound, anywhere while its center B revolves around center A of the gerotor guide 3. As described in my U.S. Pat. No. 5,152,592, the distance between A and B will remain at 0.0773 of the width of the (Reuleaux triangle) turntable 18, or one-eighth of the diameter of the large circle X.

In FIG. 2 also is a flange 24 the purpose of which is to prevent gerotor 11 from any significant upward movement if an apex 22 of the Reuleaux triangle shaped turntable is subject to a downward force, when it is projecting or approaching the projecting position from a cabinet as in FIG. 1. It is preferred that, if the gerotor guide 3 is placed on the floor of a cabinet or in a shelf of a cabinet, so that the apexes of the turntable will project from the cabinet (see the 45° cabinet face 21 outlined in FIG. 1), the gerotor guide 3 will be a part of, or anchored to, the cabinet floor or a shelf therein so that it will not be tipped by a downward force on a projecting apex 22. When gerotor guide 3 is anchored to the cabinet floor, flange 24 will prevent the turntable from tipping if there is a downward force on projecting apex 22. If gerotor guide 3 is anchored to a shelf, the shelf is preferably one which cannot be lifted in the back without removing a bracket on the back wall. To permit the gerotor 11 to pass underneath the flange 24, the gerotor 11 may be made of a thickness less than the height of profile 10, or otherwise fabricated to permit at least the outer edge of gerotor 11 to pass beneath flange 24. See FIGS. 4a–4e.

Figure 3:
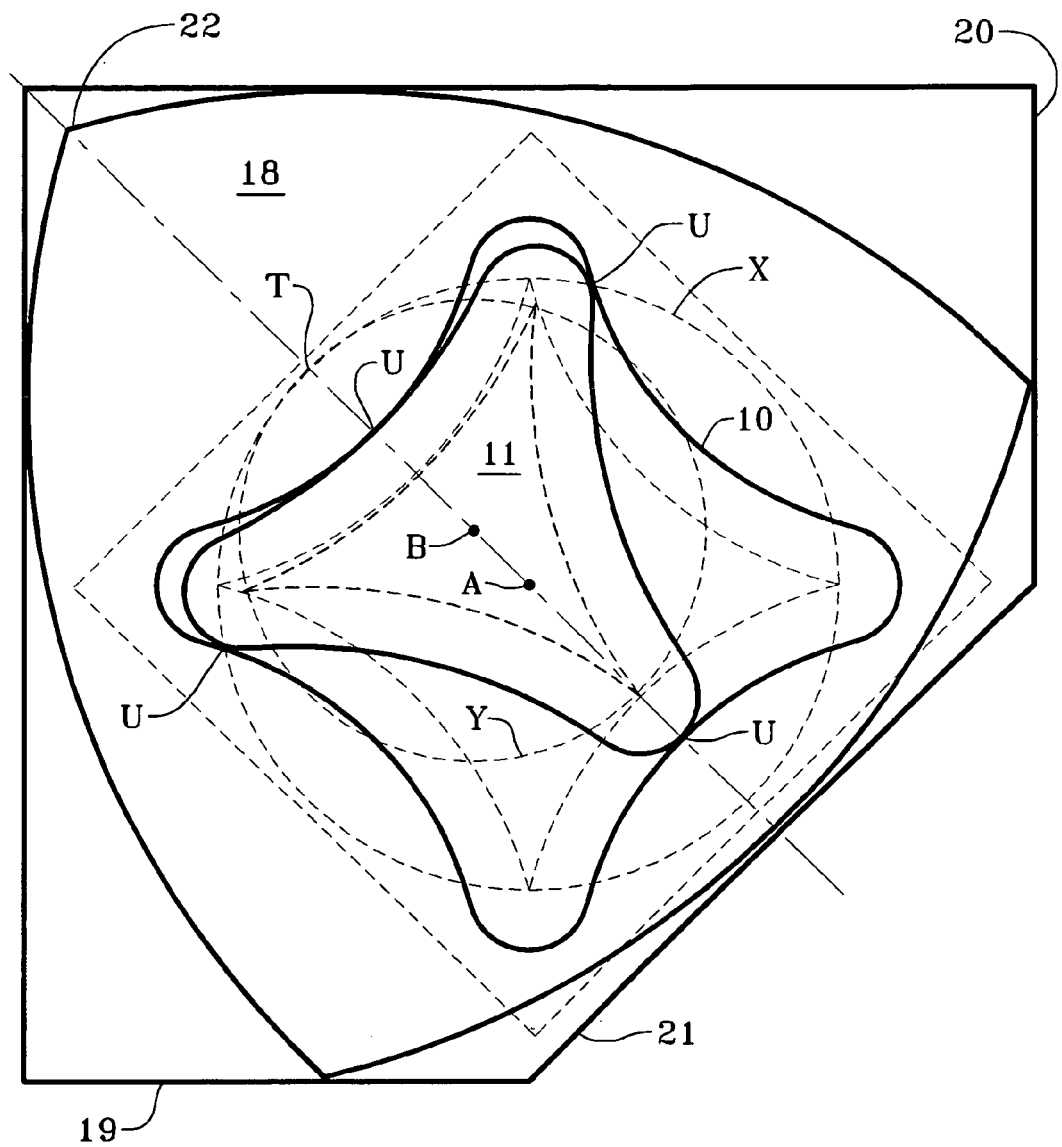
In FIG. 3, the turntable has been turned so that it is in the recessed or "parked" position, projecting into the back corner of the area in which it resides, which is again the idealized outline of the floor of a corner cabinet.

While FIG. 2 shows the turntable 18 in an intermediate position between recessed and projecting, FIG. 3 shows it in the recessed or "parked" position with apex 22 180° from cabinet face 21. If the apparatus is in a cabinet, a door (not shown) could cover its 45° face 21. Here, the imaginary hypocycloid circle Y (the "gerotor circle") has been rotated so its center B is 180° around the center point A of circle X (the "gerotor guide circle"), and it now contacts circle X at point T. Continuing the rotation of turntable 18 will cause the center B of circle Y to revolve around center A of circle X at a constant distance ⅛ of the diameter of circle X and 0.0773 times the width of turntable 18. Gerotor 11 is contained within profile 10 at four points U. If the apparatus is on a countertop or other larger surface, edges 19 and 20 of the square area and 45° face 21 will not be tangible elements—that is, the turntable 18 can simply be rotated on the larger surface, alternately being recessed and projecting.

Figure 4A:
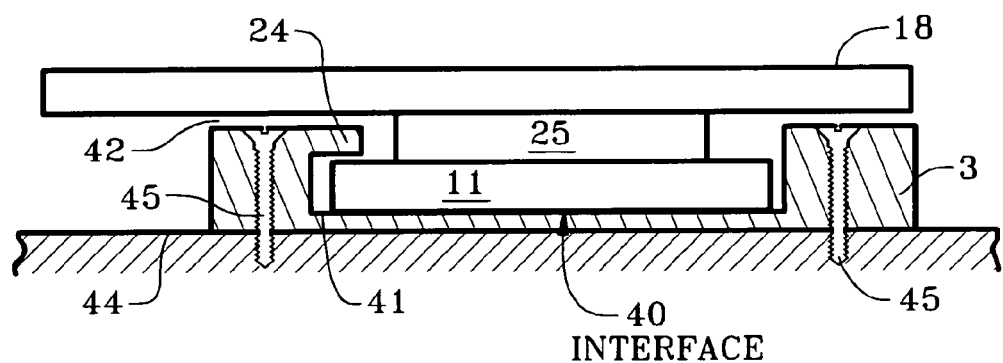
FIG. 4a is a side sectional view of the invention, showing the gerotor positioned for turning on a gerotor guide bearing.

In FIG. 4a, gerotor 11 is shown attached to turntable 18 by spacer 25. Gerotor 11 has a substantially planar gerotor bearing on its underside, forming a bearing interface at 40 with a substantially planar gerotor guide bearing 41. Here, the gerotor guide 3 is anchored to a cabinet floor 44 by screws 45. Gerotor 11 passes under flange 24 (see FIG. 2); when gerotor 11 is in the projecting position of FIG. 1, the turntable 18 cannot be tipped by a downward force on the projecting apex.

A "substantially planar" surface is not a single point as may describe the contact site of a ball bearing or ball caster, or a line as may describe the contact site of a roller bearing. Rather, a substantially planar surface as contemplated herein assumes the ordinary meaning of a planar area. Typically I will use the entire area available such as the underside of gerotor 11 or the upper surface of gerotor guide 3, but as little as 10% of the available area may be used, particularly if one chooses a low-friction material. For example, special low-friction surfaces may comprise as little as 10% of the area of the underside of gerotor 11; they should be substantially symmetrically deployed.

Figure 4B:
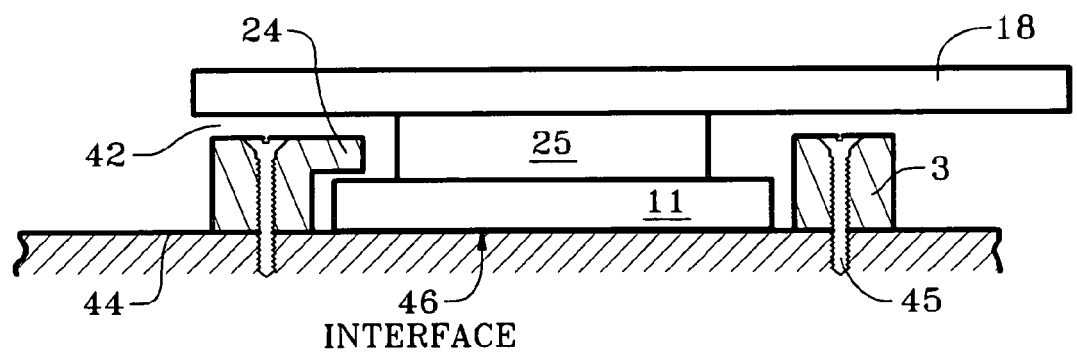
FIG. 4b shows a variation in which there is no gerotor guide bearing—rather, the gerotor guide turns on, and forms a bearing interface with, the underlying surface.

Another configuration, in FIG. 4b, shows the gerotor bearing surface interfacing at 46 with a cabinet floor 44. The gerotor guide bearing surface 41 of FIG. 4a has been eliminated, and the loadbearing occurs at the interface 46 of the gerotor guide bearing and the cabinet floor 44. Again, there is a space 42 between turntable 18 and gerotor guide 3. Gerotor guide 3 may be built into the cabinet floor 44. Persons skilled in the art will recognize that a solid surface countertop may serve the same as a cabinet floor.

Figure 4C:
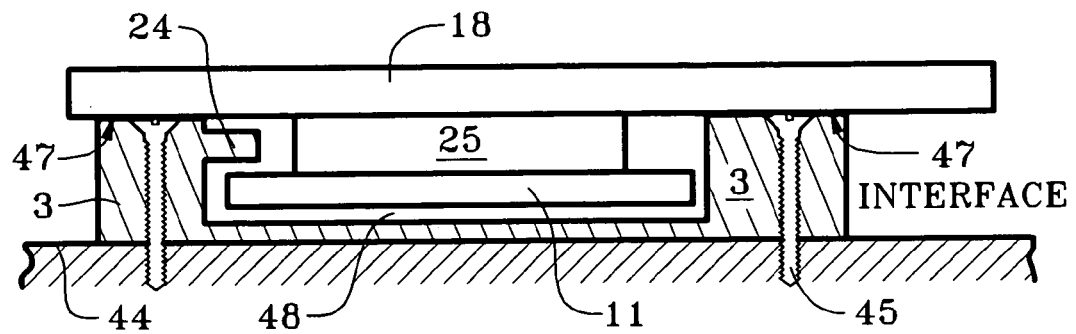
FIG. 4c shows a variation wherein the bearing surfaces are at the interface of the turntable and the gerotor guide.

In FIG. 4c, the substantially planar bearing interface is between the underside of turntable 18 and the upper surface of gerotor guide 3, specifically at interface 47. There is a space 48 between gerotor 11 and gerotor guide 3 so that no loadbearing takes place on the gerotor 3 itself. The gerotor guide 3 is fixed to a cabinet floor 44 by screws 45.

Figure 4D:
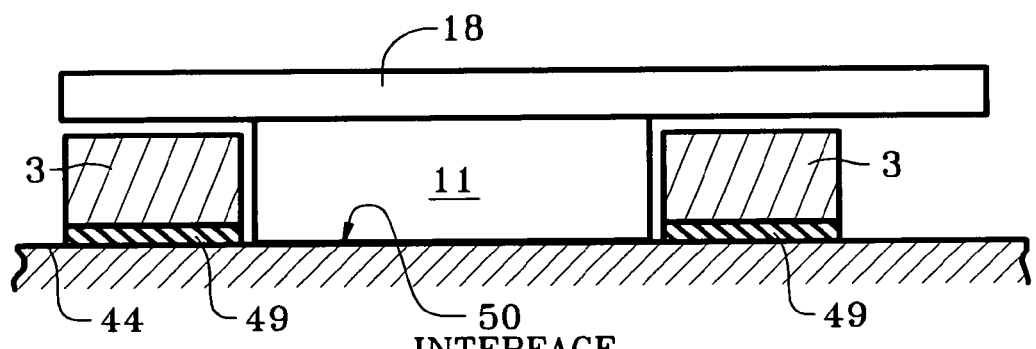
FIG. 4d is a variation wherein the gerotor bearing rests on a countertop; this also differs from the other sectional views in that there is no antitipping flange.

FIG. 4d is similar to FIG. 4b in that the gerotor 11 rests and turns on underlying surface 44 but in this case gerotor guide 3 is held in place by a slip-resistant sheet 49 instead of the screws 45 of FIG. 4b. Slip-resistant sheet 49 may be any common household slip-resistant sheet, squares, mats, pads, or "feet" designed to retain a utensil or other object in place by temporarily adhering to the underlying surface. It may be glued or otherwise fastened to the underside of gerotor guide 3, or loose; in either case, the turntable apparatus may be easily moved to clean the area or for any other purpose. It should be noted that this version of my invention has no flange 24, as there is little danger of damage or spillage if turntable 18 is tipped when the apparatus is placed on a larger surface not having a 45° face—that is, for example, in the back or inside corner of a kitchen countertop, which would provide an excellent substantially planar bearing surface on which the complementary substantially planar bearing surface under gerotor 11 may rest and turn, at interface 50. Flange 24 may be eliminated for any environment where tipping of turntable 18 is not anticipated to be a problem.

Figure 4E:
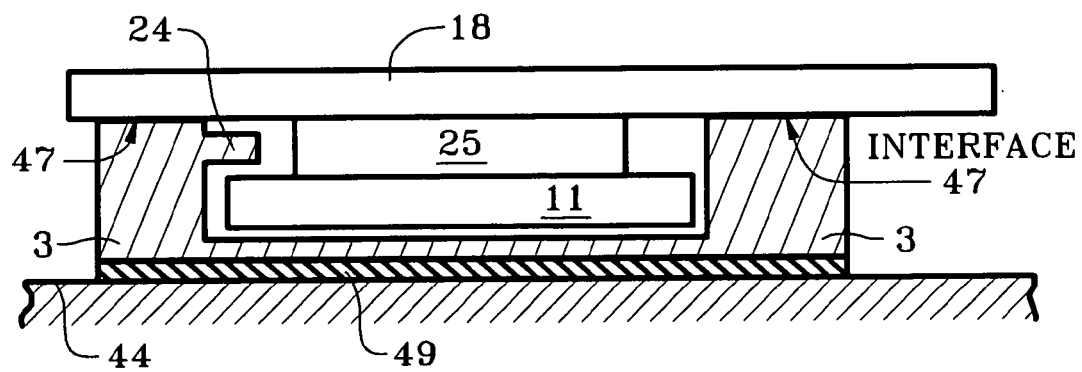
In FIG. 4e, the entire gerotor guide rests on a slip-resistant sheet, while the bearing interface is between the turntable and the gerotor guide.

FIG. 4e shows a slightly different use of a slip-resistant sheet 49, which extends over the entire underside of gerotor guide 3. Again, it may be fixed to the underside of gerotor guide 3, or simply loose. This version is shown with a flange 24 although it may not be considered necessary if the apparatus resides on a countertop. Load bearing between the turntable 18 and gerotor guide 3 takes place at interface 47 in this variation.

One advantage of planar bearings is that they eliminate metal parts and moving parts such as rollers, ball casters, and ball bearings, the expense of installing them, and the risk of their inadequate durability. However, my gerotor/gerotor guide system is not dependent on any particular kind of bearing arrangement, and it should be understood that small ball bearings, for example, may be used in any of the bearing interfaces shown in FIGS. 4a–4e.

Figure 5:
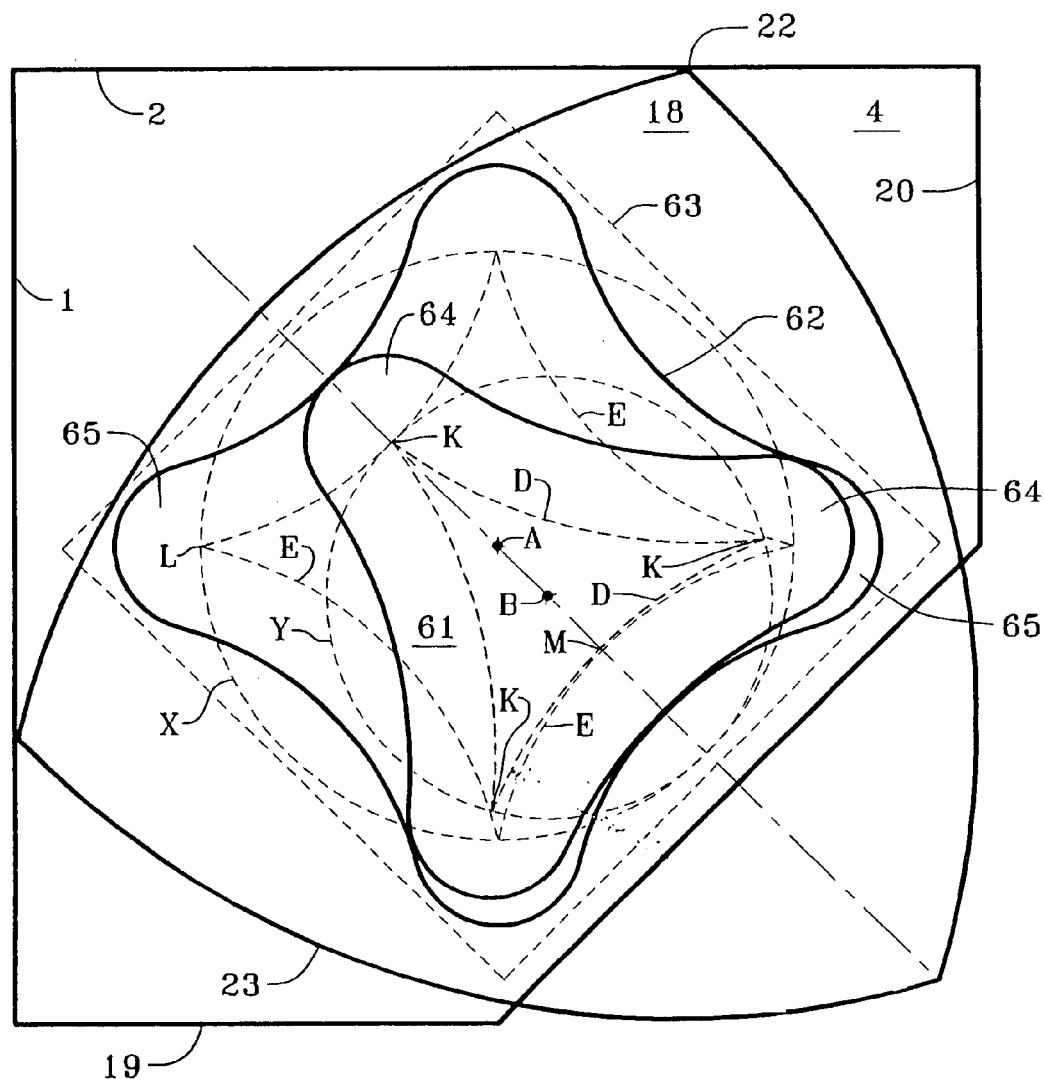
FIG. 5 shows a gerotor and a gerotor guide, again more or less diagrammatically, expanded beyond those of FIGS. 1, 2, and 3.

In FIG. 5, the profile of gerotor 61 has been expanded beyond that of the FIG. 1 version, and the profile 62 of gerotor guide 63 has also been expanded by the same dimension. While the profiles in FIG. 1 were expanded from the shapes of dotted lines D and E by a dimension about 0.25 of the radius of circle X, here the profiles are expanded an additional 0.125R, to about 0.375 times the radius of circle X. Lobes 64 of gerotor 61 fit readily into recesses 65 of gerotor guide 63. Gerotor 61 turns easily in the profile 62 of gerotor guide 63, causing the turntable 18 to turn within the square area defined by walls 1 and 2 and cabinet sides 19 and 20. FIG. 5 shows the shelf or turntable 18 in the projecting position.

Figure 6:
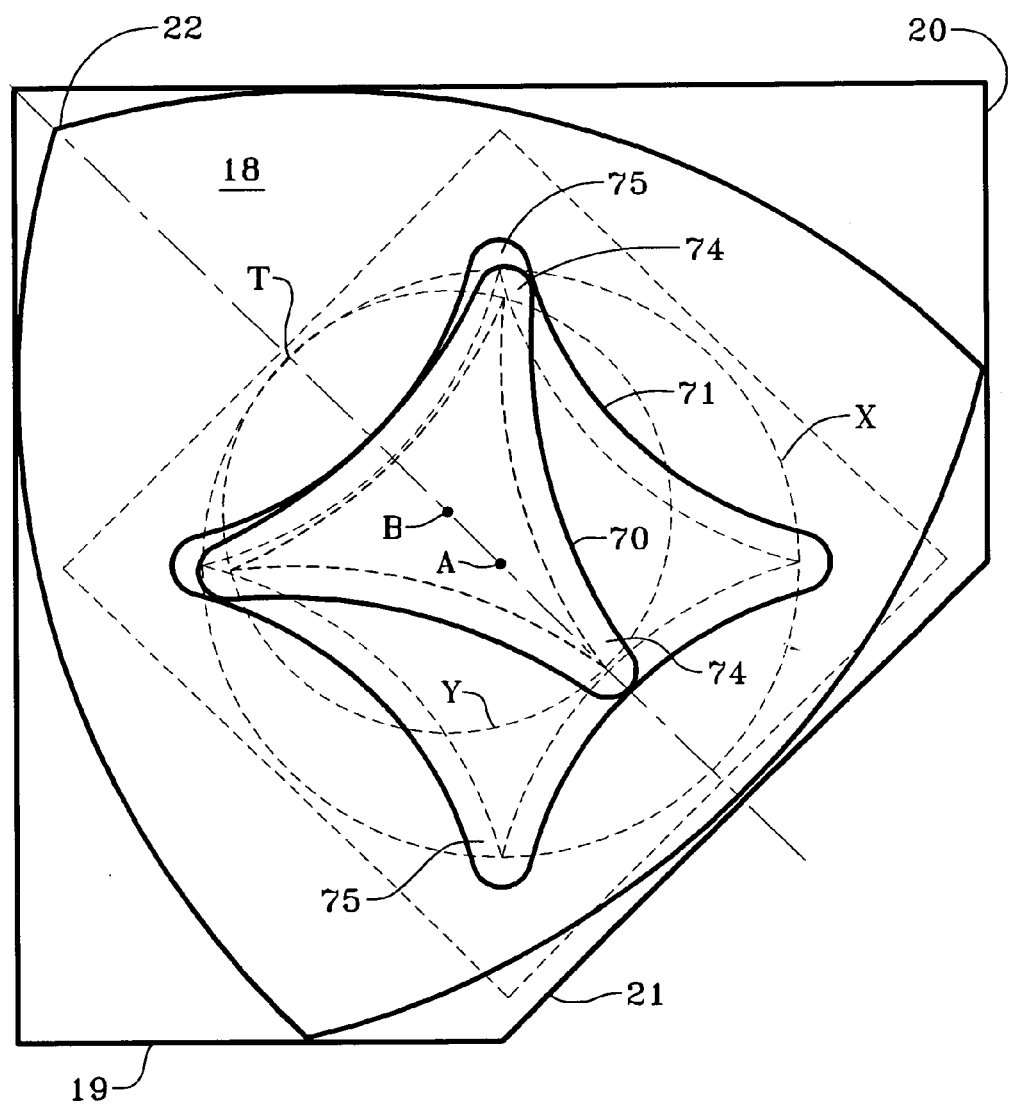
FIG. 6 shows a gerotor and gerotor guide expanded less than those of FIGS. 1, 2, and 3.

FIG. 6 shows the gerotor 70 and gerotor guide 71 expanded to a dimension about 0.1 of the radius of circle Y, making it smaller than the FIG. 1 version. Lobes 74 slide readily into recesses 75. As in FIG. 3, this depicts the recessed position for turntable 18.

In both FIGS. 5 and 6, the gerotors are attached to turntable 18, and manually turning the turntable 18 will cause the gerotor to guide its rotation to remain in the confines of the cabinet walls 1, 2, 19, and 20 or other area in which it resides, such as the back corner of a countertop. The expansions of the shapes formed by dotted lines D and E are to be made uniformly around their perimeters, which means that circular arcs having radii of the expansion factor will be used at points K and L (see FIG. 1) and will be used to form lobes 64 (FIG. 5), 74 (FIG. 6) and recesses 65 (FIG. 5) and 75 (FIG. 6).

As an example, in a 20 inch (operational) turntable, circle X will have a radius R of 6.184 inches. To make a guide with a 1.5 inch expansion factor g, the following parametric equations will yield the desired profiles. For the guide, $x=1.546 \cos \theta + 4.638 \cos \theta/3 \pm 1.5 \cos [ATAN((x'-x)/(y'-y))]$ and $y=1.546 \sin \theta - 4.638 \sin \theta/3 \pm 1.5 \sin [ATAN((x'-x)/(y'-y))]$. For the gerotor, the profile is $x=1.546 \cos \theta + 3.092 \cos \theta/2 \pm 1.5 \cos [ATAN((x'-x)/(y'-y))]$ and $y=1.546 \sin \theta - 3.092 \sin \theta/2 \pm 1.5 \sin [ATAN((x'-x)/(y'-y))]$. It will be seen that the factor 1.546 is 0.25R and 4.638 is 0.75R. The expression ± is used because, when the data point is on the positive side of the xy axis, the factor is to be added and when it is on the negative side, it is to be subtracted. For a similar profile generation, see Table 1 below.

Figure 7:
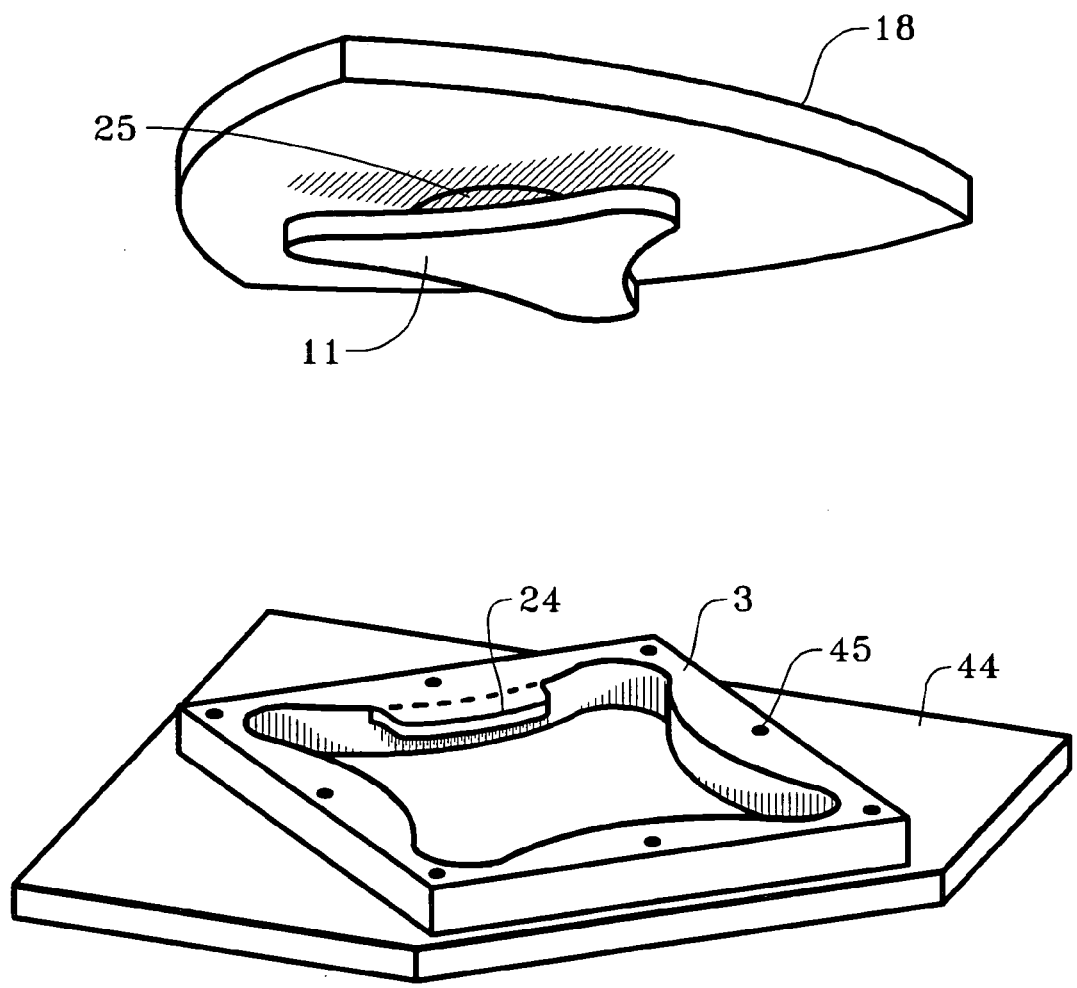
FIG. 7 is an "exploded" or open view of the rotatable and stationary parts of the invention.

A paradigm of one aspect of the invention is seen in the open two-part depiction of FIG. 7, showing the underside of turntable 18 and the upper side of gerotor guide 3. Gerotor 11 is attached to turntable 18 through spacer 25. Gerotor guide 3 is attached to cabinet floor 44 by screws 45. Gerotor 11 is easily placed within gerotor guide 3, inserting one of its lobes under flange 24. The assembled unit will then be in the projecting position of FIGS. 1 and 5, and may be turned manually with ease. Depending on the dimensions used, and particularly the thicknesses of gerotor 11 and spacer 25, the bearing interface of this illustration could be as indicated in any of FIGS. 4a, 4b, or 4c.

Figure 8:
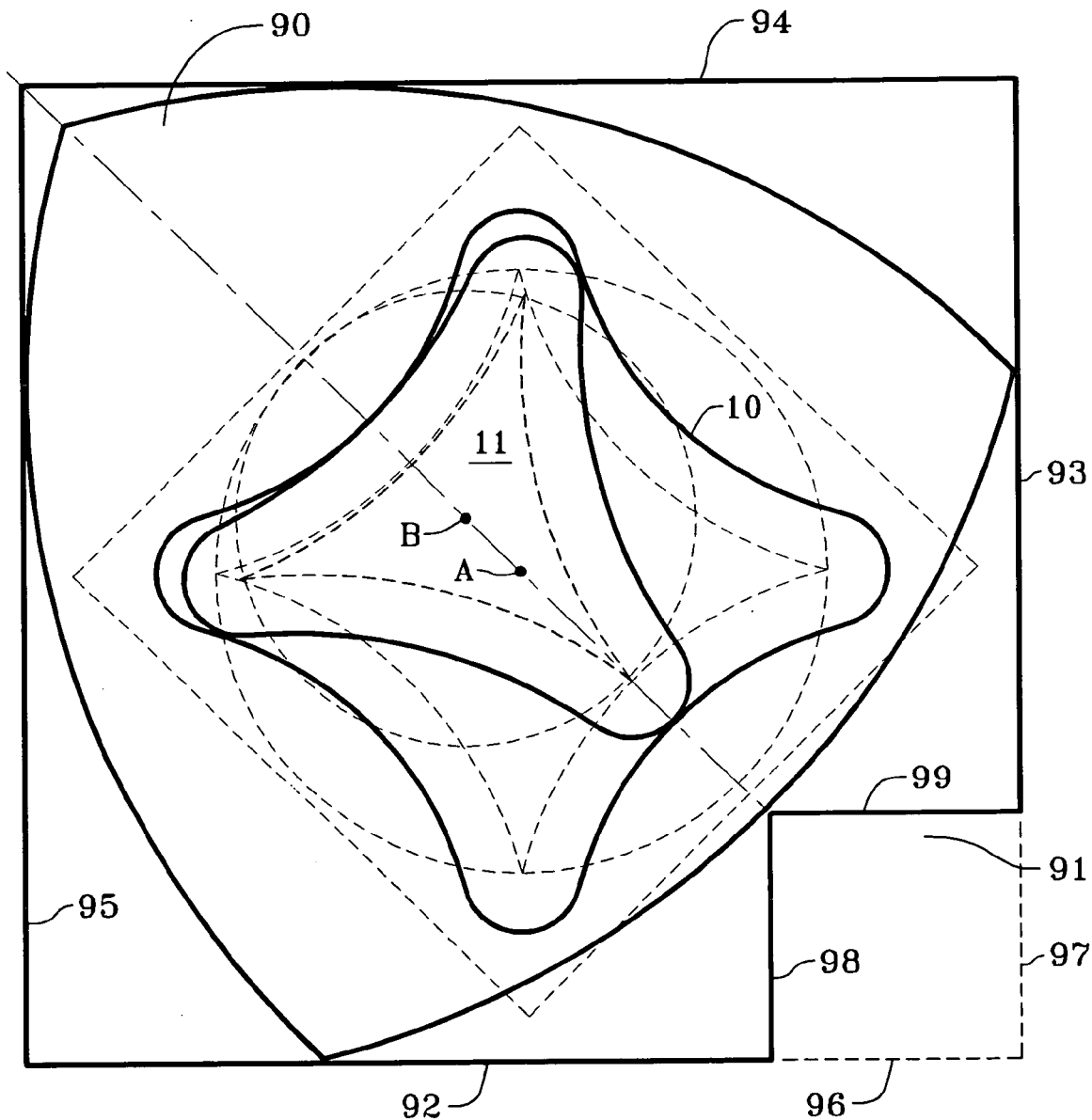
FIG. 8 shows the turntable situated in a representation of a lower, or base, or under-the-counter kitchen cabinet having a ninety degree corner.

In FIG. 8, the turntable 90 is shown recessed in a more or less idealized cabinet having a 90 degree access 91. That is, instead of the 45 degree face of FIGS. 1–3, for example, the cabinet is constructed to provide a normal corner. Persons skilled in the art will recognize that such a configuration is commonly used in base, or under-the-counter, cabinets, which are typically 24 inches deep along the wall. Accordingly, sides 92 and 93 are usually 24 inches long. However, because of the space efficiency of my invention, back walls 94 and 95 need not be the usual 36 inches. In the configuration shown in FIG. 8, the truncated portions represented by dotted lines 96 and 97 are about one-fourth the length of back walls 94 and 95. Therefore, since side walls 92 and 93 are 24 inches, back walls 94 and 95 are 32 inches, not the usual 36. This is a significant improvement; the smaller size of the corner cabinet, more than 20% less in area, permits the builder to use more of the more readily accessible wall space and/or wall cabinets while still providing ready accessibility to a large area of the corner, represented by the Reuleaux triangle shaped turntable. Corner panels 98 and 99 may be hinged doors, articulated doors, or any other type of suitable doors. Any of these may be called "90° indented doors."

Those who recognize the advantages of the more or less idealized cabinet configuration of FIG. 8 will see that when side walls 92 and 93 are 24 inches and back walls 94 and 95 are 32 inches, side walls 92 and 93 are a length 0.75 of the back walls. The size of the cabinet can be reduced even more if one wishes to make a small cut in turntable 90 to accommodate the intersection of corner panels 98 and 99, or to truncate the intersection with a 45° panel. My invention, in this aspect, therefore contemplates side walls which are from 0.6 to 0.85 times the length of base walls 94 and 95.

Figure 9A:
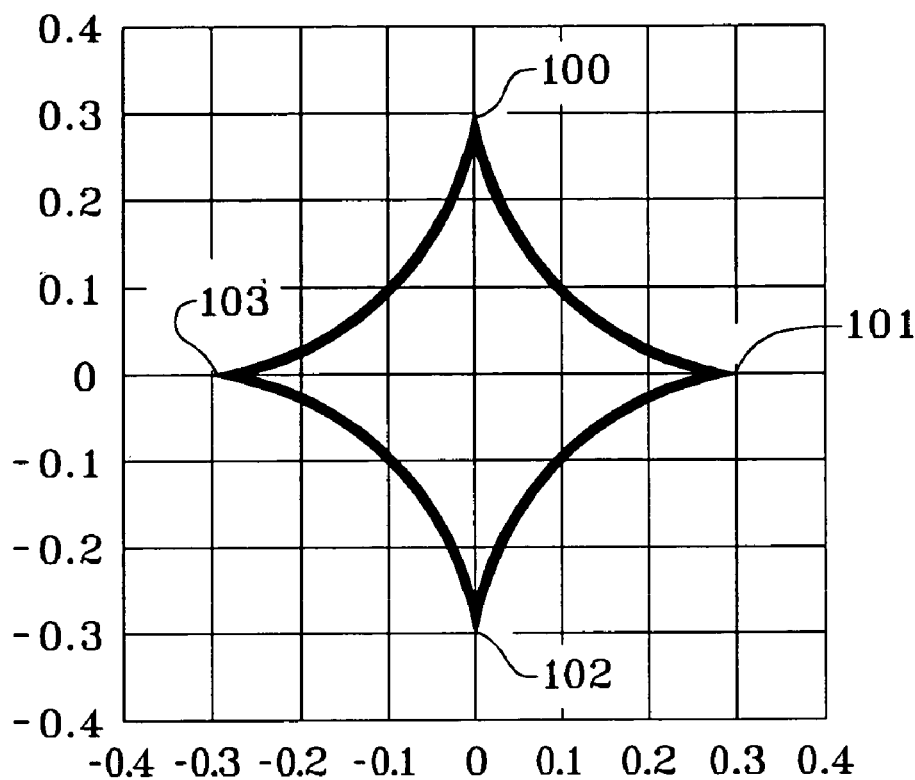
FIG. 9a is an Excel® software printout of the path of a point on a circle equivalent to circle Y of FIG. 1 rotated within a circle equivalent to circle X of FIG. 1 in a hypocycloid relationship.
Figure 9B:
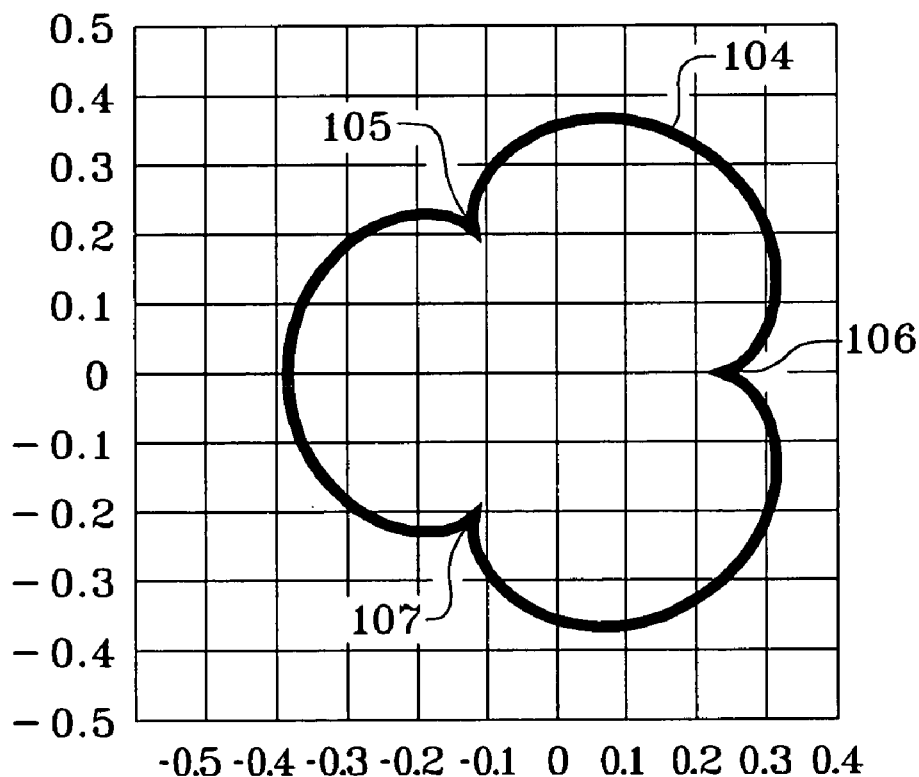
FIG. 9b is an Excel® printout of the points generated when a similar circle X is rotated on the outside of but constantly in contact with a similar smaller circle Y, also in a hypocycloid relationship.

In the Excel® software printout of FIG. 9a, it may be seen clearly from the x-axis that the apexes of the printout, points 100, 101, 102, and 103, are at points of a distance slightly greater than 0.3 beyond 0 in each direction. In fact, they are at 0.3092, which was chosen because of the relationships described above. That is, the computer was asked to find the four points at which a point on a circle having a radius of 0.3092 would contact a circle having a radius ¾ its size as it rotates around and in contact with it. This printout was obtained by using the known parametric equations for hypocycloid rotation. Persons skilled in the art may recognize that a computer need not be used, as the rotation will cause contact at four points on the larger circle, and that these points will be 0.3092 from the center of the x,y axes. These four points provide the basis for the base guide described elsewhere herein (see FIGS. 1, 2, and 3 as well as FIGS. 10 and 11. FIG. 9b shows the generally cloverleaf-shaped contour or profile 104 obtained by solving the hypocycloid parametric equations x=−0.25 COS(t)−0.3092 COS(−t/4) and y=−0.0773 SIN(t)+0.3092 SIN(−t/4). While FIG. 9b is mathematically accurate and will cause a Reuleaux triangle geometric figure attached to its center to rotate within a square area when guided by points 100, 101, 102, and 103 of FIG. 9a, it is felt that a physical embodiment of points 100, 101, 102, and 103 is not practical, and the cusps 105, 106, and 107 (FIG. 9b) are too sharp to be of practical use.

Figure 10:
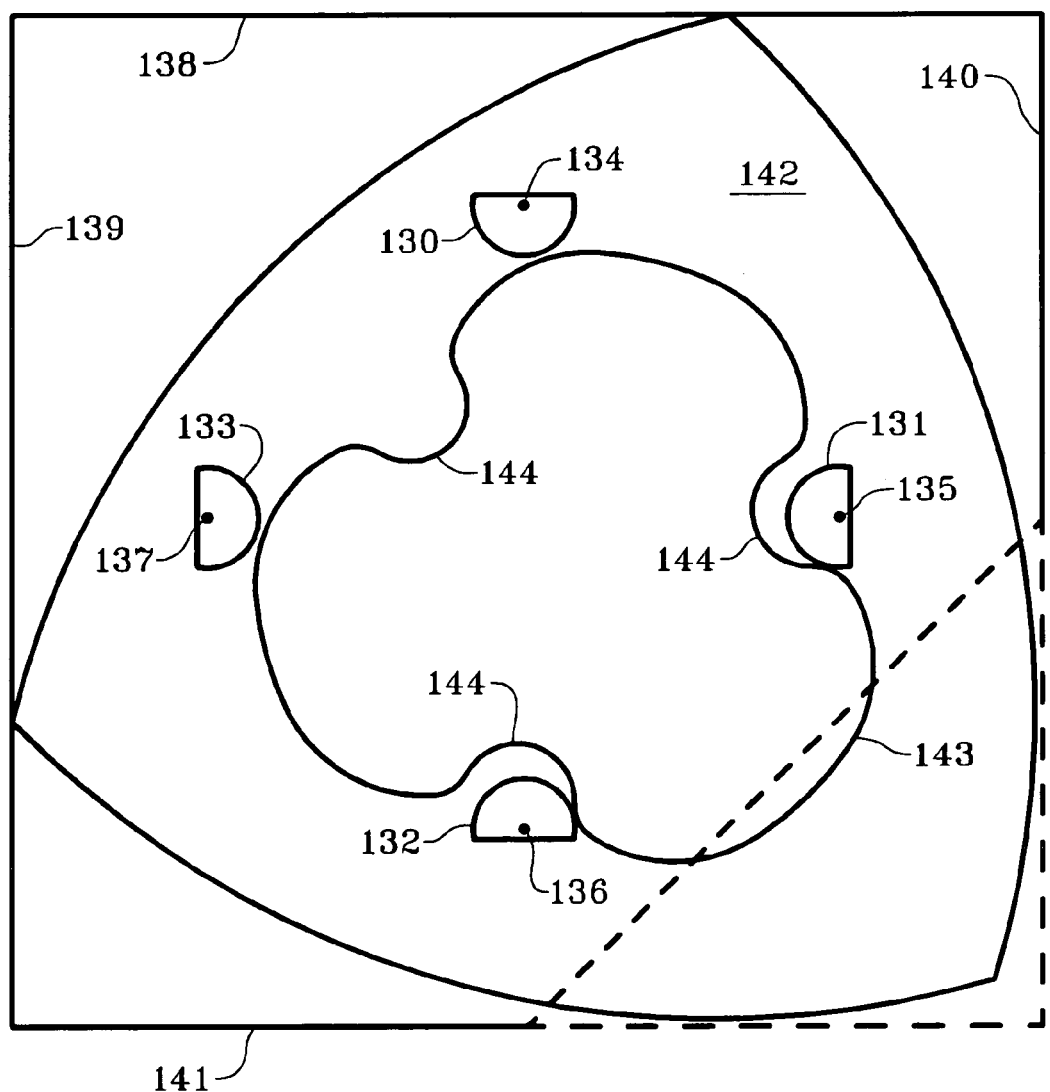
FIG. 10 shows, in outline form, four base guide members having circular arc gerotor guide profiles mounted in a cabinet or other square area, and the contracted, generally cloverleaf-shaped, gerotor profile fixed to the underside of the turntable; the turntable is in the projecting position.

FIG. 10 shows the four base guide profiles 130, 131, 132, and 133, which comprise circular arcs drawn from origins at 134, 135, 136, and 137 respectively. These base guide profiles are placed as shown in a cabinet comprising back walls 138 and 139, and side walls 140 and 141. In FIG. 10, a Reuleaux triangle-shaped turntable 142 is illustrated in a projecting position, as in FIG. 2. Here, however, a generally cloverleaf-shaped turntable guide profile 143 is fixed to the underside of turntable 142. The turntable guide profile 143 is positioned so that it rests generally inside the base guide profiles 130, 131, 132, and 133. Each of the base guide profiles 130, 131, 132, and 133 contacts the turntable guide profile at one point, thus assuring that the turntable 142 will rotate only in the manner desired. In the configuration depicted in FIG. 10, a generally cloverleaf-like contour proportional to that of FIG. 9b has been contracted by a dimension g, and the base guide profiles 130, 131, 132 and 133 each represents a circular arc having a radius g, drawn from an origin equivalent to that of points 100, 101, 102, and 103 of FIG. 9a. In FIG. 10, the dimension or contraction g is 0.05, where R is 0.3092. The cloverleaf profile 143 has been provided with indentations 144 of radius g, connecting and completing the contracted cloverleaf 143.

Figure 11:
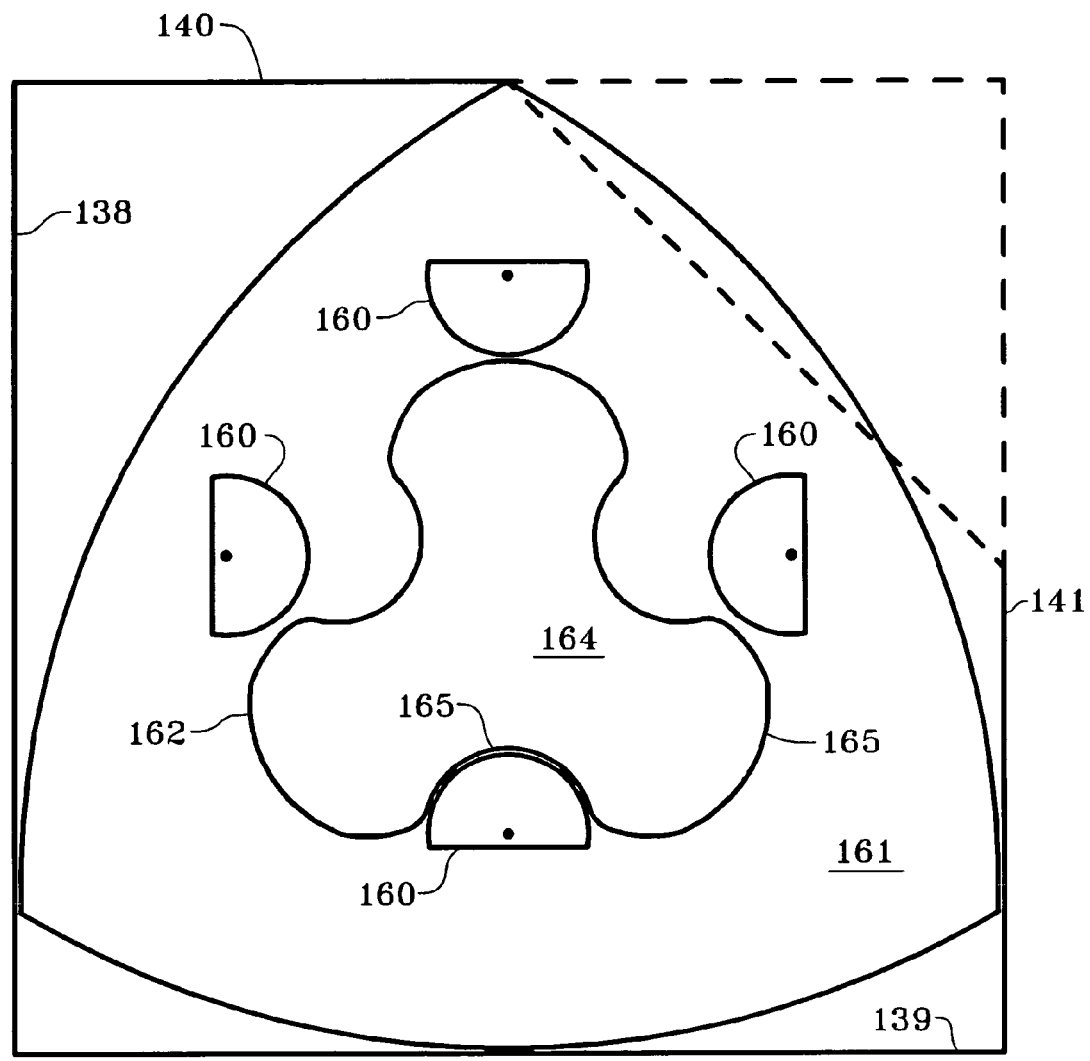
FIG. 11 is similar to FIG. 10, but the turntable guide profiles are larger in size compared to FIG. 10, and the gerotor is correspondingly smaller; the turntable is in an intermediate position in a corner cabinet.

In FIG. 11, the dimension or contraction factor g is 0.1, where R is 0.3092, making the cloverleaf gerotor 164 smaller than the gerotor of FIG. 10, and base guide profiles 160, being circular arcs having a radius 0.1, are larger than base guide profiles 130, 131, 132 and 133 of FIG. 10. The turntable 161 is in an intermediate position but it is seen that the gerotor profile 162 is contained by the base guide profiles 160 at four points, assuring that the turntable will turn only in the desired manner.

As with the variations of FIGS. 1, 2, and 3, useful expansion factors g for the variations of FIGS. 10 and 11 may be found in the range 0.1R to 0.5R. It is also to be understood that FIGS. 10 and 11 are intended to illustrate the principle of the "cloverleaf" guide variation of my invention, and that the side views of FIGS. 4a–4e are applicable, including the use of flanges, which may be configured particularly on the two rear guide profiles—that is, profiles 130 and 133 of FIG. 10 and the two profiles 160 nearest back walls 138 and 140 of FIG. 11. And, the circular arc guide profiles 130, 131, 132, 133 and 160 may be constructed as full circles or circular arcs less than 360°. Also, guide profiles extending further towards the respective sides of the cabinet may serve to guide an expanded, rather than contracted, "cloverleaf" gerotor profile. Where the circular arc guide profiles are full circles, they may be mounted on vertical axes and made freely rotatable. Whether or not they are rotatable, full circular guide profiles may be used with either expanded or contracted "cloverleaf" gerotors.

Referring again to FIG. 10, parametric data points for the turntable guide profile 43 (gerotor) may be generated on Excel® software using functions listed as follows:

COLUMN

A To generate data points for each three degrees of rotation, in radians, use increments of 0.5236 radians.
B −0.0773 COS(t) where t is the angle taken from column A.
C −0.3092 COS(−t/4) where t is the angle taken from column A
D −0.773 SIN(t) where t is the angle taken from column A
E 0.3092 SIN(−0.025(t)) where t is the angle taken from column A
F B+A Note—this yields x
G D−E Note—this yields y
H (second G minus first G)·1/(second F minus first F). note—this yields the slope, in terms of a ratio, of a line between the two x,y points; continue from point to point.
I ARCTANGENT, in radians, of the slope. Note—this yields the angle of the slope.
J SIN of the slope angle.
K SIGN of the SIN just obtained in column K times the same SIN. Note—this eliminates all negatives in the SIN function.
L COSINE of the slope angle.
M SIGN of the COSINE just obtained in column L times the same COSINE. Note—this eliminates all negatives in the COSINE function.
N g times the result in column K. Note—this gives the length of the contraction for x, where g is the desired contraction dimension.
O g times the result in column M. Note—this gives the length of the contraction for y, where g is the desired contraction dimension, Having obtained the contraction functions for each of x and y, it is necessary to assure that contractions will in fact be obtained. Each curve segment in FIG. 9b is scrutinized to determine whether to add to or subtract from the original x component of the data point and the corresponding y component of the data point in question. Assuming that the data for columns N and O begin at row 5, then the additions and subtractions are shown in Table 1:

TABLE 1

| Rows | x | y |
|---|---|---|
| 5–52 | − | + |
| 53–100 | − | − |
| 101–148 | + | − |
| 149–164 | + | + |
| 165–196 | − | − |

TABLE 1-continued

| Rows | x | y |
| --- | --- | --- |
| 197–244 | + | − |
| 245–293 | + | + |
| 294–324 | − | + |
| 325–340 | + | − |
| 341–388 | + | + |
| 389–436 | − | + |
| 437–484 | − | − |

Where g is 0.05, the above procedure will generate the cloverleaf shape of FIG. 9b, except that the circular arcs must be supplied by using an origin for the radius midway between the ends of the leaf portions of the cloverleaf to complete a configuration as shown in FIG. 10; where g is 0.1, the design of FIG. 11 will result. Note from FIG. 11 that a circular arc 160 is to fit a substantially circular indent on gerotor 164 at interface 165. Again, it is recommended that some room for ease of turning should be designed into the dimensions.

It is to be understood that the ratios and dimensions used throughout may be multiplied to make a turntable and turning mechanism of a desired width. For example, the numbers 0.0773 and 0.3092 should be multiplied by 20 to obtain the mechanism for a 20 inch shelf. Also, the term "lobe" is used herein in its dictionary sense—a rounded projection. Where a gerotor is said to have three lobes, it should be understood the lobes will have the properties and dimensions necessary for the gerotor to turn while constrained within a gerotor guide as described elsewhere herein. While all the lobes illustrated in FIGS. 1–3, 5–8, 10 and 11 have circular arc profiles, whose radii originate from points on hypothetical circles such as X and Y representing the 4:3 ratio explained herein, it is possible, using gear technology or otherwise, to construct more complex curves and complementary recesses on the gerotor guide. Such more complex curves, which usually necessitate modifying the entire gerotor profile, are contemplated within my invention so long as the gerotor has three lobes, the gerotor guide has four recesses, and the profiles of both are entirely curved, unlike the device of FIG. 9 of U.S. Pat. No. 5,152,592.

As mentioned above, when a Reuleaux triangle is made to inscribe a square exactly, its center does not follow an exact circular path, but rather follows a path comprising four elliptical curves. Likewise, it is possible to construct a modified gerotor and a modified gerotor guide manifesting slight deviations from circles in order to cause the Reuleaux triangle apexes to follow more perfectly straight sides on the square area. This may be done, if desired, by manually plotting the path of a point equivalent to point K in FIG. 1 as the Reuleaux triangle is made to follow precisely straight lines representing the sides of the square area. A gerotor guide and a gerotor can be made by expanding uniformly the perimeter of the path thus generated. They are substantially similar to those generated from the more accurately circular gerotor circle and gerotor guide circle. Thus the term "a geometric figure satisfying the hypocycloid parametric equation . . . " is intended to include one slightly modified to provide straighter lines on the sides of the square inscribed by the Reuleaux triangle.

My invention also includes a turntable assembly comprising (a) a turntable guide base of claim 32 and (b) a turntable in the shape of a Reuleaux triangle having on its underside a turntable guide profile which is a contraction or expansion of the path described by the parametric equations x=−0.25R cos θ−0.75R cos θ/4 and y=−0.25R sin θ+0.75R sin θ/4, where R is 0.3092 times the width of the Reuleaux triangle, θ is an incremental rotation angle, and wherein the contraction or expansion is a contraction or expansion of the dimension g from the perimeter of the path, the dimension g being substantially equal to the radii of the four circular arc profiles, the turntable guide profile being positioned in a relationship with the turntable guide base so that the turntable guide base will guide the rotation of the turntable when it is turned. The dimension g may be 0.1R to 0.5R. The turntable assembly may have at least one substantially planar bearing interface between the turntable guide base and the turntable, and/or each of the base and the turntable may have at least one substantially planar bearing surface for interfacing with a substantially planar bearing surface on the other. The turntable assembly may be one wherein the guide base is situated within a corner cabinet so that the four circular arc profiles are located to permit the turntable alternately to project from the cabinet and recess within the cabinet as it is turned.

Also, my invention includes a turntable in the shape of a Reuleaux triangle, the turntable having a guide profile thereon which is a contraction of the path described by the parametric equations x=−0.25R cos θ−0.75R cos θ/4 and y=−0.25R sin θ0.75R sin θ/4, where R is 0.3092 times the width of the Reuleaux triangle and θ is an incremental rotation angle, particularly wherein the profile is a contraction of the path by a dimension g which is in the range of 0.1R to 0.5R.

The invention claimed is:

1. A turntable in the shape of a Reuleaux triangle and having a gerotor attached thereto, said gerotor having three substantially identical lobes, wherein said gerotor has a perimeter determined by an expansion of the path defined by the parametric equations x=r/3 cos θ+2r/3 cos θ/2 and y=r/3 sin θ−2r/3 sin θ/2, where r is 0.2319 times the width of said turntable, where θ is the angle of the center of a small circle with respect to the center of a large circle within which said small circle is rotated while remaining in contact with said large circle, and wherein said lobes are substantially circular arcs.

2. A turntable of claim 1 wherein the expansion is by a dimension g substantially uniformly around the perimeter of said path, and wherein g is from about 0.1 times r to about 0.67r.

3. A corner cabinet comprising (a) a pair of side walls in substantially orthogonal planes, said side walls having a depth extending to substantially orthogonal back walls and terminating to form an opening in a front of said cabinet, and (b) a turntable of claim 1 on at least one level in said corner cabinet.

4. A corner cabinet of claim 3 wherein said turntable is movable on at least one planar bearing.

5. A corner cabinet of claim 3 wherein said side walls are from 0.6 times the length of said back walls to about 0.85 times the length of said back walls.

6. A corner cabinet of claim 5 wherein said length of said side walls is about 0.75 the length of said back walls.

7. A corner cabinet of claim 5 including at least one door forming a 90° indented corner.

8. A corner cabinet comprising (a) a pair of side walls in substantially orthogonal planes, said side walls having a depth extending from substantially orthogonal back walls and terminating to form an opening in a front of said cabinet, and (b) a turntable of claim 1.

9. A corner cabinet comprising (a) a pair of side walls in substantially orthogonal planes, said side walls having a depth extending from substantially orthogonal back walls and terminating to form an opening in a front of said cabinet, and (b) a turntable of claim 1, said turntable movable on at least one planar bearing.

10. A turntable guide base having a center, said guide base comprising four substantially equal circular arc base guide profiles, said four circular arc profiles each having a radius g originating at an origin equidistant from said center, said origins being on said base and being ninety degrees apart from each other with respect to said center, said four substantially equal circular arc base guide profiles being separate and unconnected with each other.

11. A turntable assembly comprising (a) a turntable guide base of claim 10 and (b) a turntable in the shape of a Reuleaux triangle having on its underside a turntable guide profile which is a contraction of the path described by the parametric equations $x=-0.25R\cos\theta+-0.75R\cos\theta/4$ and $y=-0.25R\sin\theta+0.75R\sin\theta/4$, where R is 0.3092 times the width of said Reuleaux triangle, $\theta$ is an incremental rotation angle, and wherein said contraction is a contraction of said dimension g from the perimeter of said path, said dimension g being substantially equal to the radii of said four circular arc base guide profiles, said turntable guide profile being positioned in a relationship with said turntable guide base so that said turntable guide base will guide the rotation of said turntable when it is turned.

12. A turntable assembly of claim 11 wherein said dimension g is 0.1R to 0.5R.

13. A turntable assembly of claim 11 having at least one substantially planar bearing interface between said turntable guide base and said turntable.

14. A turntable assembly of claim 11 wherein each of said base and said turntable has at least one substantially planar bearing surface for interfacing with a substantially planar bearing surface on the other.

15. A turntable assembly of claim 11 wherein said guide base is situated within a corner cabinet so that said four circular arc profiles are located to permit said turntable alternately to project from said cabinet and recess within said cabinet as it is turned.

16. A turntable in the shape of a Reuleaux triangle, said turntable having a guide profile thereon which is a contraction of the path described by the parametric equations $x=-0.25R\cos\theta-0.75R\cos\theta/4$ and $y=-0.25R\sin\theta+0.75R\sin\theta/4$, where R is 0.3092 times the width of said Reuleaux triangle and $\theta$ is an incremental rotation angle.

17. Turntable of claim 16 wherein said profile is a contraction of said path by a dimension g which is in the range of 0.1R to 0.5R.

* * * * *